United States Patent
Kang

(10) Patent No.: US 7,411,761 B2
(45) Date of Patent: Aug. 12, 2008

(54) SEEK ADAPTATION SYSTEM IN HARD DISK DRIVES

(75) Inventor: Chang-Ik Kang, Fremont, CA (US)

(73) Assignee: Samsung Electronics Co., Ltd., Suwon (JP)

( * ) Notice: Subject to any disclaimer, the term of this patent is extended or adjusted under 35 U.S.C. 154(b) by 0 days.

(21) Appl. No.: 11/586,966

(22) Filed: Oct. 25, 2006

(65) Prior Publication Data

US 2008/0100956 A1 May 1, 2008

(51) Int. Cl.
*G11B 5/596* (2006.01)
(52) U.S. Cl. .................................. 360/78.09
(58) Field of Classification Search ............... 360/78.09, 360/78.06, 75, 78.04
See application file for complete search history.

(56) References Cited

U.S. PATENT DOCUMENTS

| | | | | |
|---|---|---|---|---|
| 5,333,083 A | * | 7/1994 | Nakano | 360/77.04 |
| 6,369,972 B1 | * | 4/2002 | Codilian et al. | 360/78.04 |
| 6,490,115 B1 | * | 12/2002 | Suzuki et al. | 360/75 |
| 6,917,486 B2 | * | 7/2005 | Tanner | 360/75 |
| 7,009,806 B2 | * | 3/2006 | Zayas et al. | 360/78.04 |
| 7,082,009 B2 | * | 7/2006 | Zayas et al. | 360/78.04 |
| 2006/0268449 A1 | * | 11/2006 | Chu et al. | 360/78.06 |

* cited by examiner

*Primary Examiner*—Fred Tzeng
(74) *Attorney, Agent, or Firm*—Ben J. Yorks; Irell & Manella LLP

(57) ABSTRACT

A hard disk drive with a voice coil motor circuit that provides a current to a voice coil motor to perform a seek routine in a seek time. The disk drive includes a temperature sensor to sense a temperature of the disk drive and a voltage sensor to sense the voltage of the voice coil motor. The circuit adjust the seek time dependent upon the sensed temperature and voltage. By way of example, the circuit will increase the seek time if there is an increase in temperature and/or a decrease in voltage.

10 Claims, 5 Drawing Sheets

SEEK ADAPTATION SYSTEM IN HARD DISK DRIVES

BACKGROUND OF THE INVENTION

1. Field of the Invention

The present invention relates to a seek routine of a hard disk drive.

2. Background Information

Hard disk drives contain a plurality of magnetic heads that are coupled to rotating disks. The heads write and read information by magnetizing and sensing the magnetic fields of the disk surfaces. Each head is attached to a flexure arm to create a subassembly commonly referred to as a head gimbal assembly ("HGA"). The HGA's are suspended from an actuator arm. The actuator arm has a voice coil motor that can move the heads across the surfaces of the disks.

Information is typically stored in radial tracks that extend across the surface of each disk. Each track is typically divided into a number of segments or sectors. The voice coil motor and actuator arm can move the heads to different tracks of the disks.

FIG. 1 shows a typical track that has a number of fields associated with each sector. A sector may include an automatic gain control ("AGC") field 1 that is used to adjust the strength of the read signal, a sync field 2 to establish a timing reference for the circuits of the drive, and ID 3 and Gray Code 4 fields to provide sector and track identification.

Each sector may have also a servo field 5 located adjacent to a data field 6. The servo field 5 contains a plurality of servo bits A, B, C and D that are read and utilized in a servo routine to position the head 7 relative to the track. By way of example, the servo routine may utilize the algorithm of $((A-B)-(C-D))$ to create a position error signal ("PES"). The PES is used to create a drive signal for the voice coil motor to position the head on the track.

To access data at different disk tracks the drive enters a seek routine. During a seek routine a requested address location is provided and a corresponding seek time and drive current are calculated to drive the voice coil motor and move the heads to the desired location. The temperature of the drive and the voltage provided to the voice coil motor can fluctuate during operation of the disk drive. Variations in temperature and voltage can change the seek time required to move the heads to the desired track location. For example, a low voltage will not move the heads a sufficient distance in a stated seek time. Likewise, an increase in temperature will cause a corresponding increase in the electrical resistance of the voice coil and reduction in the driving current of the VCM. It would be desirable to provide a hard disk drive that accounts for variations in temperature and voltage for a seek routine in the drive.

BRIEF SUMMARY OF THE INVENTION

A hard disk drive with a voice coil motor circuit that provides a current to a voice coil motor to perform a seek routine in a seek time. The disk drive includes a temperature sensor to sense a temperature of the disk drive and a voltage sensor to sense a voltage of the drive. The seek time is adjusted based on the sensed temperature and voltage.

DETAILED DESCRIPTION

Described is a hard disk drive with a voice coil motor circuit that provides a current to a voice coil motor to perform a seek routine in a seek time. The disk drive includes a temperature sensor to sense a temperature of the disk drive and a voltage sensor to sense the voltage of the voice coil motor. The seek time is adjusted based on the sensed temperature and voltage. By way of example, the circuit will increase the seek time if there is an increase in temperature and/or a decrease in voltage.

Figure 2:
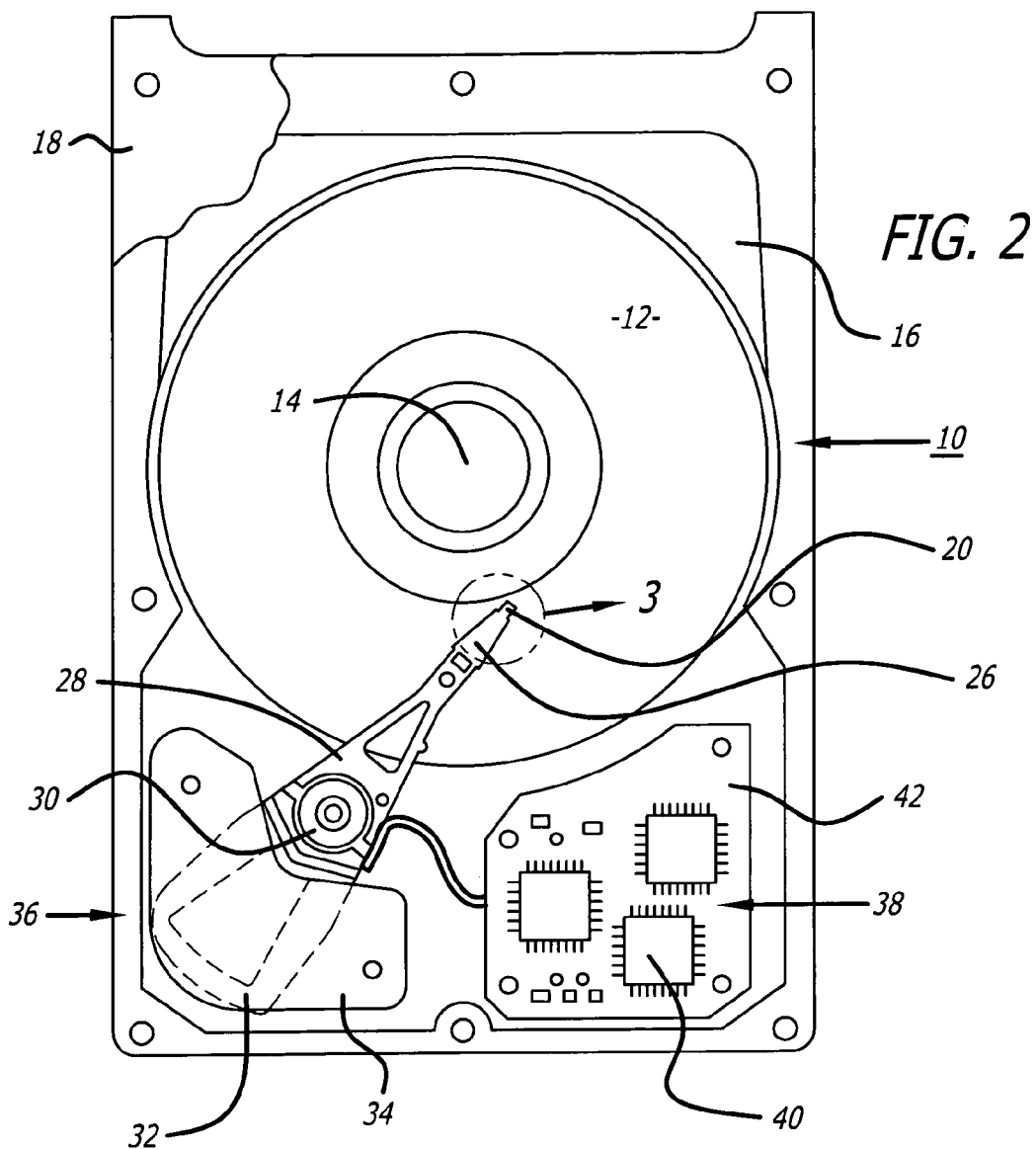
FIG. 2 is a top view of an embodiment of a hard disk drive.

Referring to the drawings more particularly by reference numbers, FIG. 2 shows an embodiment of a hard disk drive 10. The disk drive 10 may include one or more magnetic disks 12 that are rotated by a spindle motor 14. The spindle motor 14 may be mounted to a base plate 16. The disk drive 10 may further have a cover 18 that encloses the disks 12.

Figure 3:
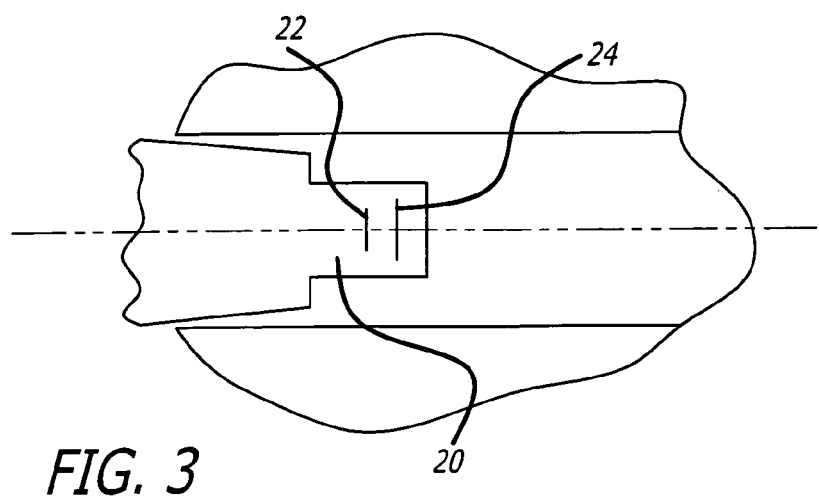
FIG. 3 is a top enlarged view of a head of the hard disk drive.

The disk drive 10 may include a plurality of heads 20 located adjacent to the disks 12. As shown in FIG. 3 the heads 20 may have separate write 24 and read elements 22. The write element 24 magnetizes the disk 12 to write data. The read element 22 senses the magnetic fields of the disks 12 to read data. By way of example, the read element 22 may be constructed from a magneto-resistive material that has a resistance which varies linearly with changes in magnetic flux.

Referring to FIG. 2, each head 20 may be gimbal mounted to a suspension arm 26 as part of a head gimbal assembly (HGA). The suspension arms 26 are attached to an actuator arm 28 that is pivotally mounted to the base plate 16 by a bearing assembly 30. A voice coil 32 is attached to the actuator arm 28. The voice coil 32 is coupled to a magnet assembly 34 to create a voice coil motor (VCM) 36. Providing a current to the voice coil 32 will create a torque that swings the actuator arm 28 and moves the heads 20 across the disks 12.

The hard disk drive 10 may include a printed circuit board assembly 38 that includes one or more integrated circuits 40 coupled to a printed circuit board 42. The printed circuit board 40 is coupled to the voice coil 32, heads 20 and spindle motor 14 by wires (not shown).

Figure 4:
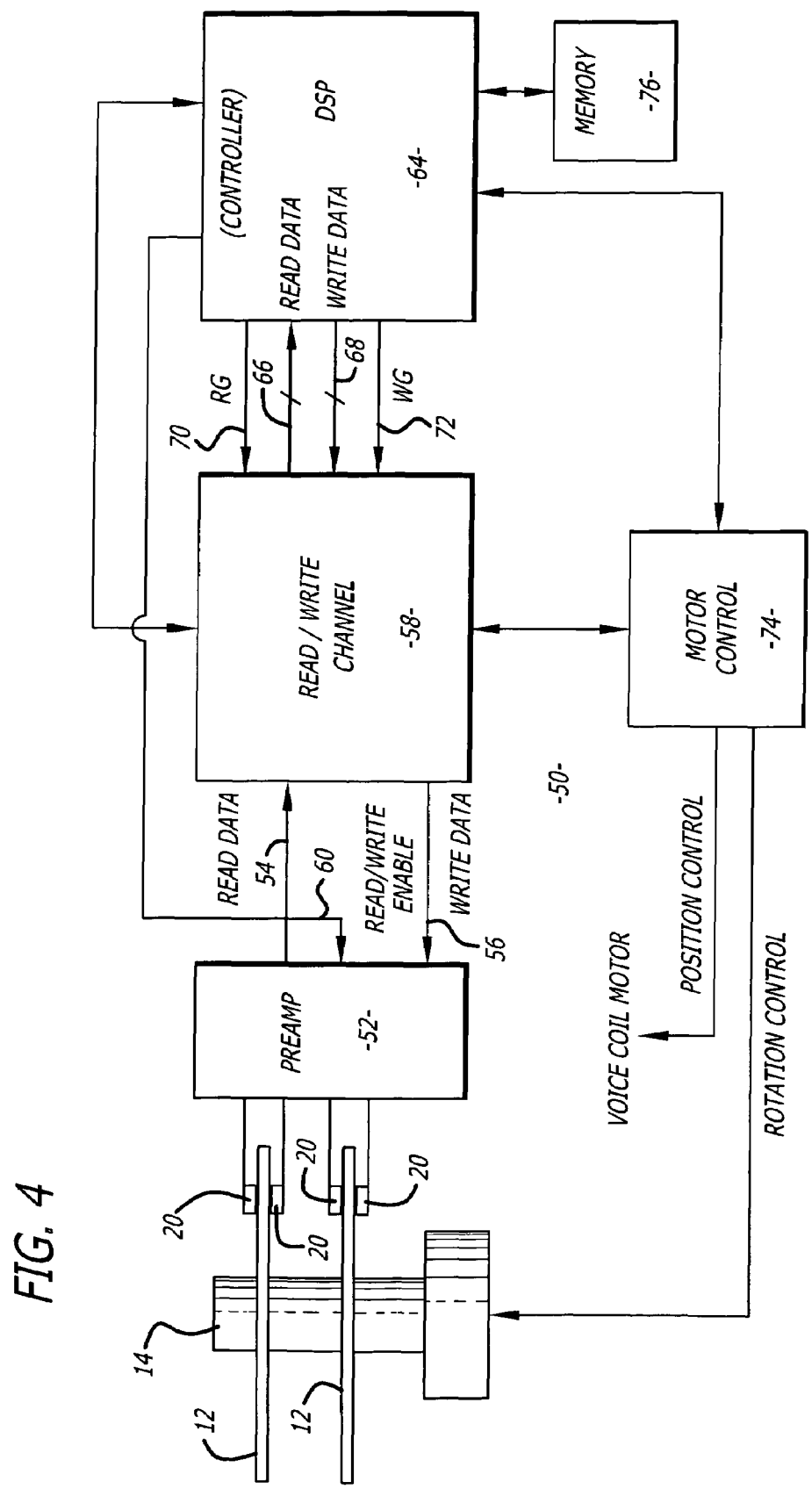
FIG. 4 is a schematic of an electrical circuit for the hard disk drive.

FIG. 4 shows an electrical circuit 50 for reading and writing data onto the disks 12. The circuit 50 may include a pre-amplifier circuit 52 that is coupled to the heads 20. The pre-amplifier circuit 52 has a read data channel 54 and a write data channel 56 that are connected to a read/write channel circuit 58. The pre-amplifier 52 also has a read/write enable gate 60 connected to a controller 64. Data can be written onto the disks 12, or read from the disks 12 by enabling the read/write enable gate 60.

The read/write channel circuit 58 is connected to a controller 64 through read and write channels 66 and 68, respectively, and read and write gates 70 and 72, respectively. The read gate 70 is enabled when data is to be read from the disks 12. The write gate 72 is enabled when writing data to the disks 12. The controller 64 may be a digital signal processor that operates in accordance with a software routine, including a routine(s) to write and read data from the disks 12. The read/write channel circuit 58 and controller 64 may also be connected to a motor control circuit 74 which controls the voice coil motor 36 and spindle motor 14 of the disk drive 10. The controller 64 may be connected to a non-volatile memory device 76. By way of example, the device 76 may be a read only memory ("ROM") that contains instructions that are read by the controller 64.

Figure 1:
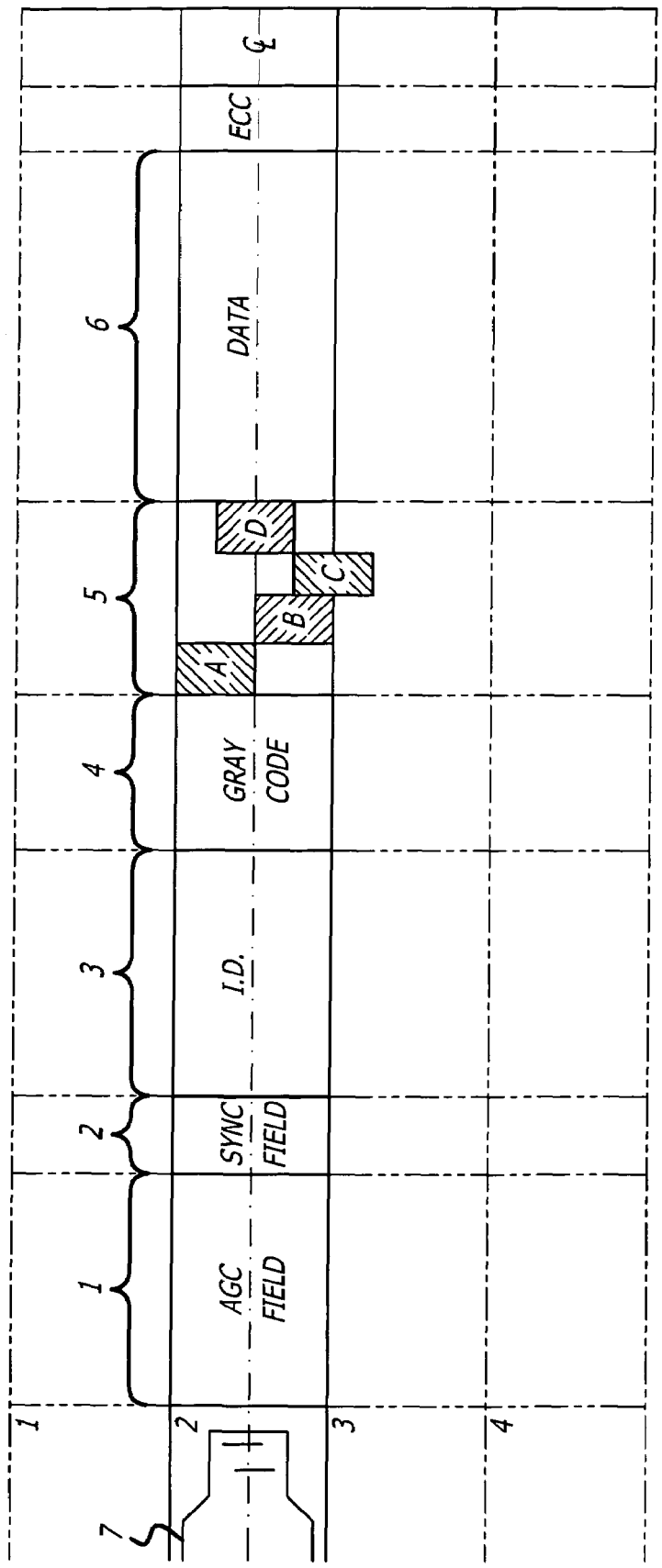
FIG. 1 is an illustration of a track of the prior art.

Each sector of a disk track typically has servo bits A, B, C and D as shown in FIG. 1. The controller 64 may operate a servo routine utilizing the servo bits to position the head relative to the track. The head is moved in accordance with a position error signal ("PES"). The PES reflects the difference between a target position and the actual position of the head.

Figure 5:
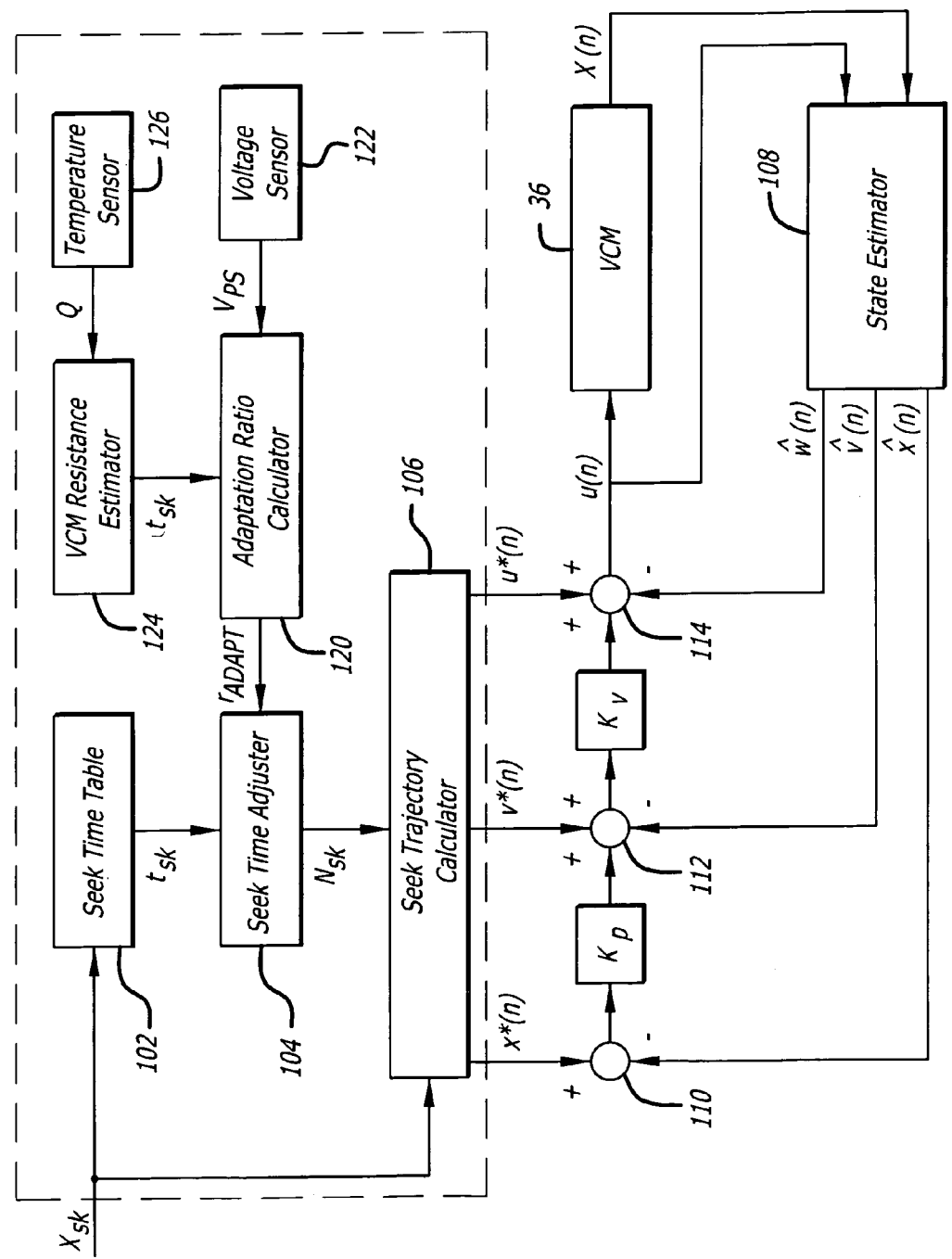
FIG. 5 is a schematic of a servo for the hard disk drive.

FIG. 5 shows a schematic of a servo 100 used to perform a seek operation. The servo is typically performed by the controller 64. In a seek operation the heads are moved from one track location to another track location. The seek distance $x_{sk}$ can be provided to a Seek Time Table 102 that provides a nominal seek time $N_{sk}$ from a predefined table. The nominal seek time is adjusted by a Seek Time Adjustor 104 and provided to a Seek Trajectory Calculator 106. The Seek Trajectory Calculator 106 calculates a position trajectory $x^*(n)$, a velocity trajectory $v^*(n)$ and a drive current trajectory $u^*(n)$. The circuit 100 may include a state estimator 108 that generates predicted values $\hat{x}(n)$, $\hat{v}(n)$ and $\hat{w}(n)$ based on the drive current $u(n)$ and position $x(n)$. The predicted values 108 are provided to adders 110, 112 and 114. The outputs of adders 110 and 112 are provided to plant and voice coil motor transforms $K_p$ 116 and $K_v$ 118, respectively. The output of adder 114 is the current $u(n)$ provided to the voice coil motor 36.

The Seek Time Adjustor 104 computes an adjusted seek time $N_{sk}$ in accordance with the following equation:

$$N_{SK} = r_{ADAPT} N^*_{SK} \quad (1)$$

Where $r_{ADAPT}$ is an adaptation ratio calculated by an Adaptation Ratio Calculator 120. The Ratio Calculator 120 can compute the adaptation ratio $r_{ADAPT}$ with the following equation:

$$r_{ADAPT} = \frac{N_{SK}}{N^*_{SK}} = \sqrt{\frac{R_{VCM} V^*_{PS}}{R^*_{VCM} V_{PS}}} \quad (2)$$

Where $R^*_{vcm}$ is the electrical resistance of the voice coil at a nominal temperature, $V^*_{vps}$ is the drive voltage at a nominal power supply voltage. $V_{vps}$ is a voltage provided to the voice coil motor that is sensed by a voltage sensor 122.

$R_{vcm}$ is provided by a VCM Resistance Estimator 124 that is dependent on a temperature of the disk drive sensed by a temperature sensor 126. The correlation between temperature and voice coil resistance can be determined at a test and/or manufacturing facility. The data can be defined with the following straight line equation:

$$R_{VCM} = A \times q + B \quad (3)$$

Using a least squared method the coefficents A and B can be computed with the following matrices:

$$\begin{bmatrix} A \\ B \end{bmatrix} = \left( \begin{bmatrix} Q_1 & \cdots & Q_N \\ 1 & \cdots & 1 \end{bmatrix} \begin{bmatrix} Q_1 & 1 \\ \vdots & \vdots \\ Q_N & 1 \end{bmatrix} \right)^{-1} \begin{bmatrix} Q_1 & \cdots & Q_N \\ 1 & \cdots & 1 \end{bmatrix} \begin{bmatrix} R_1 \\ \vdots \\ R_N \end{bmatrix} \quad (4)$$

To reduce computation time equation (2) can be computed using the following second order polynominal:

$$y = \sqrt{x} \approx c_0 x^2 + c_1 x + c_2 \quad (5)$$

Where coefficient $c_0$, $c_1$ and $c_2$ are derived using a least squared method and the following matrices.

$$\begin{bmatrix} c_0 \\ c_1 \\ c_2 \end{bmatrix} = \left( \begin{bmatrix} x_1^2 & x_2^2 & \cdots & x_N^2 \\ x_1 & x_2 & \cdots & x_N \\ 1 & 1 & \cdots & 1 \end{bmatrix} \begin{bmatrix} x_1^2 & x_1 & 1 \\ x_2^2 & x_2 & 1 \\ \vdots & \vdots & \vdots \\ x_N^2 & x_N & 1 \end{bmatrix} \right)^{-1} \begin{bmatrix} x_1^2 & x_2^2 & \cdots & x_N^2 \\ x_1 & x_2 & \cdots & x_N \\ 1 & 1 & \cdots & 1 \end{bmatrix} \begin{bmatrix} \sqrt{x_1} \\ \sqrt{x_2} \\ \vdots \\ \sqrt{x_N} \end{bmatrix} \quad (6)$$

In operation a seek length is requested and converted to a seek time by Table 102. The temperature is sensed and a voice coil resistance $R_{vcm}$ is determined by Estimator 124 using equation (3). The adaptation ratio $r_{ADAPT}$ is calculated using equation (2) and an adjusted seek time $N_{sk}$ is determined using equation (1). The adjusted seek time compensates for variations in temperature and voltage that would effect the seek time and would otherwise result in inaccurate seek movement of the heads.

Figure 6:
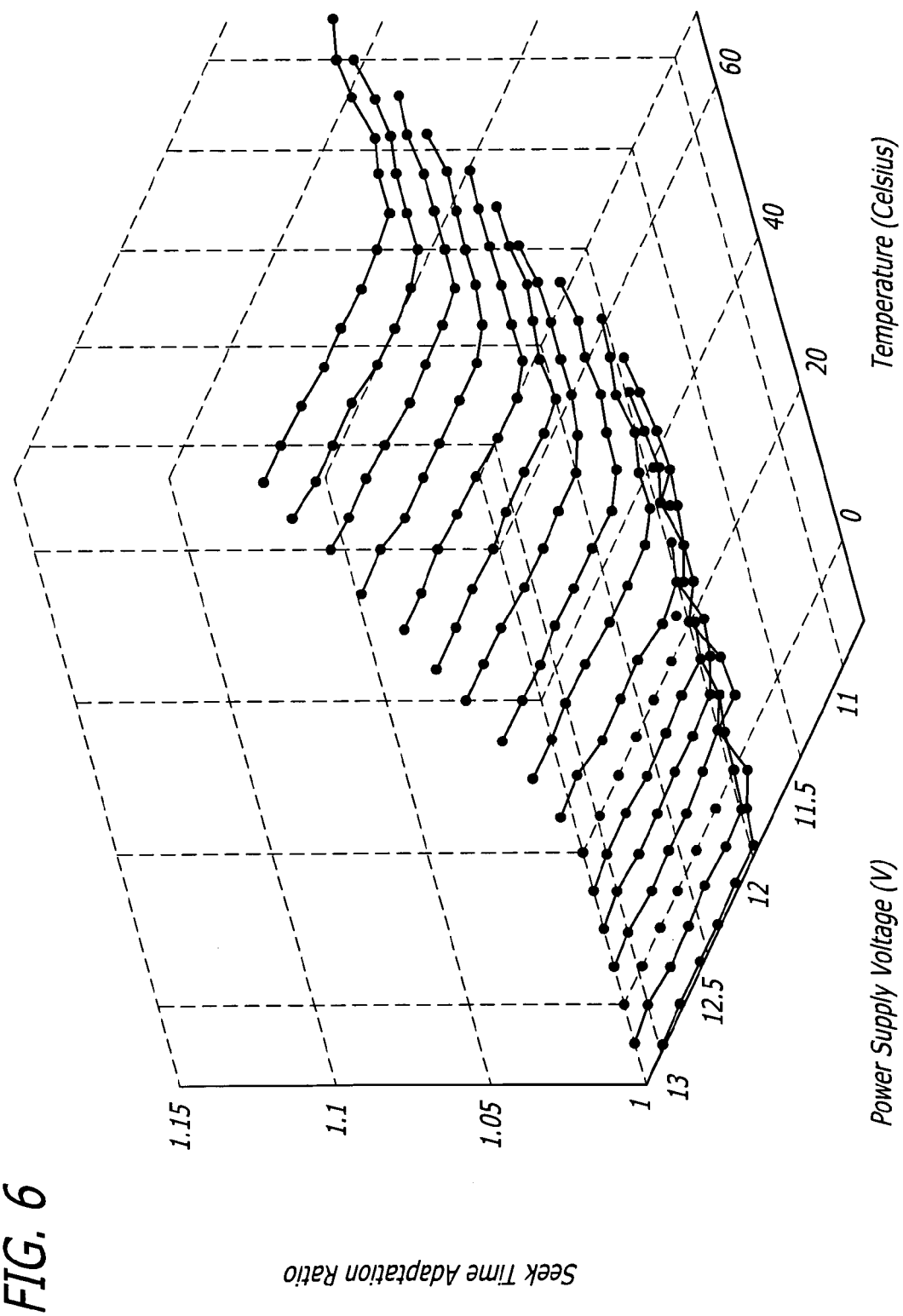
FIG. 6 is a graph of an adaptation ratio versus a hard disk drive temperature and a drive voltage.

FIG. 6 shows a variation in the adaptation ratio $r_{ADAPT}$ as a function of disk drive temperature and disk drive voltage. The adaptation ratio $r_{ADAPT}$ increases with an increase in the temperature and/or voltage.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A hard disk drive, comprising:
    a disk;
    a head coupled to said disk;
    an actuator arm coupled to said head;
    a voice coil motor actuator coupled to said actuator arm;
    a temperature sensor that senses a temperature within the hard disk drive;
    a voltage sensor coupled to said voice coil motor and senses a voltage; and,
    a circuit coupled to said voice coil motor, said temperature sensor and said voltage sensor, said circuit provides a current to said voice coil motor to perform a seek operation in a seek time, said seek time is adjusted based on said sensed temperature and said sensed voltage and in accordance with an equation that has the form of:

$$N_{SK} \propto \frac{1}{\sqrt{I_{VCM}}} \propto \sqrt{\frac{R_{VCM}}{V_{PS}}}.$$

2. The hard disk drive of claim 1, wherein said circuit includes a seek time table, a seek trajectory calculator coupled to said voice coil motor, a seek time adjuster coupled to said seek trajectory calculator and said seek time table, a voice coil motor resistance estimator coupled to said temperature sensor, and an adaptation ratio calculator coupled to said voice coil motor resistance estimator, said voltage sensor and said seek time adjustor.

3. The hard disk drive of claim 1, wherein said circuit includes a feedforward loop.

4. The hard disk drive of claim 1, wherein said circuit includes a controller.

5. A hard disk drive, comprising:
a disk;
a head coupled to said disk;
an actuator arm coupled to said head;
a voice coil motor coupled to said actuator arm;
a temperature sensor that senses a temperature within the hard disk drive;
a voltage sensor coupled to said voice coil motor and senses a voltage of said voice coil motor; and,
circuit means for providing a current to said voice coil motor to perform a seek operation in a seek time and adjusting said seek time based on said sensed temperature and said sensed voltage and in accordance with an equation that has the form of:

$$N_{SK} \propto \frac{1}{\sqrt{I_{VCM}}} \propto \sqrt{\frac{R_{VCM}}{V_{PS}}}.$$

6. The hard disk drive of claim 5, wherein said voice coil motor circuit means includes a seek table, a seek trajectory calculator coupled to said voice coil motor, a seek time adjuster coupled to said seek trajectory calculator and said seek time table, a voice coil motor resistance estimator coupled to said temperature sensor, and an adaptation ratio calculator coupled to said voice coil motor resistance estimator, said voltage sensor and said seek time adjustor.

7. The hard disk drive of claim 5, wherein said circuit includes a feedforward loop.

8. The hard disk drive of claim 5, wherein said circuit includes a controller.

9. A method for performing a seek routine in a hard disk drive, comprising:
determining a seek time to move at least one head across a disk;
sensing a temperature within the hard disk drive;
sensing a voltage;
adjusting the seek time based on the sensed temperature and sensed voltage in accordance with an equation that has the form of:

$$N_{SK} \propto \frac{1}{\sqrt{I_{VCM}}} \propto \sqrt{\frac{R_{VCM}}{V_{PS}}}; \text{ and,}$$

providing a current to the voice coil motor to move the at least one head across the disk.

10. The method of claim 9, further comprising calculating a voice coil motor resistance with the sensed temperature, calculating an adaptation ratio from the voice coil motor resistance and calculating the adjusted seek time from the adaptation ratio.

* * * * *